United States Patent
Wagu et al.

(10) Patent No.: US 7,299,904 B2
(45) Date of Patent: Nov. 27, 2007

(54) BRAKE FLUID PRESSURE MAINTAINING APPARATUS FOR VEHICLES

(75) Inventors: Takayuki Wagu, Nagano-ken (JP); Kazuhiko Kobayashi, Kanagawa-ken (JP)

(73) Assignees: Nissin Kogyo Co., Ltd., Nagano-Ken (JP); Transtron, Inc., Kanagawa-Ken (JP)

( * ) Notice: Subject to any disclaimer, the term of this patent is extended or adjusted under 35 U.S.C. 154(b) by 0 days.

(21) Appl. No.: 10/720,257

(22) Filed: Nov. 25, 2003

(65) Prior Publication Data

US 2004/0140714 A1   Jul. 22, 2004

(30) Foreign Application Priority Data

Nov. 26, 2002   (JP) .......................... P.2002-341971

(51) Int. Cl.
*B60K 28/16*   (2006.01)
(52) U.S. Cl. ................... 188/113.2; 188/119.2
(58) Field of Classification Search ............ 303/119.2, 303/113.2; 251/129.02, 129.14, 129.15, 251/129.19; 137/625.25, 596.17, 625.5, 137/627.5
See application file for complete search history.

(56) References Cited

U.S. PATENT DOCUMENTS

| | | | |
|---|---|---|---|
| 5,167,442 A * | 12/1992 | Alaze et al. ............. | 303/113.2 |
| 5,445,446 A * | 8/1995 | Yamamuro ............... | 303/117.1 |
| 5,603,483 A * | 2/1997 | Reuter et al. .......... | 251/129.02 |
| 5,771,933 A * | 6/1998 | Akamatsu et al. ....... | 137/627.5 |
| 5,975,654 A * | 11/1999 | Zaviska et al. .......... | 303/119.2 |
| 6,056,373 A * | 5/2000 | Zechmann et al. ........ | 303/191 |
| 6,065,495 A * | 5/2000 | Fong et al. ............ | 137/625.25 |
| 6,086,515 A * | 7/2000 | Buschmann et al. ........ | 477/194 |
| 6,247,766 B1 * | 6/2001 | Subramanian et al. ... | 303/119.2 |
| 6,309,033 B1 * | 10/2001 | Zaviska .................. | 303/119.2 |
| 6,345,870 B1 * | 2/2002 | Linkner et al. .......... | 303/119.2 |
| 6,415,897 B1 * | 7/2002 | Sugimoto et al. .......... | 188/353 |
| 6,533,081 B2 * | 3/2003 | Totsuka et al. ............ | 188/110 |
| 6,547,344 B2 * | 4/2003 | Hada et al. ................ | 303/191 |
| 2002/0021045 A1 * | 2/2002 | Hada et al. .............. | 303/113.1 |

FOREIGN PATENT DOCUMENTS

| | | |
|---|---|---|
| DE | 40 02 865 A1 | 8/1991 |
| EP | 1 013 519 A2 | 6/2000 |
| JP | 2000-190828 | 7/2000 |
| JP | 2001-225731 | 8/2001 |
| WO | WO 95/19282 | 7/1995 |
| WO | WO 96/10507 | 4/1996 |
| WO | WO 96/14227 | 5/1996 |
| WO | WO 02/090159 | 11/2002 |

* cited by examiner

*Primary Examiner*—Christopher P. Schwartz
(74) *Attorney, Agent, or Firm*—Greenblum & Bernstein, P.L.C.

(57) ABSTRACT

A brake fluid pressure maintaining apparatus for a vehicle, having: a master cylinder; a check valve; and, a normally-open-type electromagnetic valve including an electromagnetic coil, a fixed core, and a movable core, and in the brake fluid pressure maintaining state, it is closed and, in the brake fluid pressure no-maintaining state, it is always opened, and by changing the value of the current, an attracting force is changed; by setting the attracting force at a given value, the brake fluid pressure to be maintained on the wheel brake side is set; and, when it is closed, in case where the brake fluid pressure of the wheel brake is higher than the attracting force of the given value, it is opened against the attracting force to thereby reduce the brake fluid pressure of the wheel brake down to the given value.

23 Claims, 5 Drawing Sheets

BRAKE FLUID PRESSURE MAINTAINING APPARATUS FOR VEHICLES

BACKGROUND OF THE INVENTION

1. Field of the Invention

The present invention relates to a brake pressure maintaining apparatus for a vehicle including a normally-open-type electromagnetic valve which, even after a driver releases his or her foot from a brake pedal to thereby remove a braking operation, is closed so as to be able to maintain the brake fluid pressure of a wheel brake temporarily. And, the normally-open-type electromagnetic valve has the following relief function: that is, the brake fluid pressure to be maintained by the wheel brake is set according to the value of a current to be applied to an electromagnetic coil and, when the brake fluid pressure of the wheel brake is higher than the thus-set given value, the normally-open-type electromagnetic valve is temporarily opened to thereby lower the brake fluid pressure of the wheel brake down to the given value.

2. Description of the Related Art

Conventionally, in order to maintain the brake fluid pressure of the wheel brake temporarily even after removal of the brake operation, as a vehicle brake fluid brake maintaining apparatus provided with a normally-open-type electromagnetic valve, there are known the cited related inventions (JP-A-2000-190828 and JP-A-2001-225731). In the case of the normally-open-type electromagnetic valve used in these conventional related arts, in the interior of a housing which is disposed in a brake fluid flow passage between a master cylinder and a wheel brake, there is disposed a valve seat including a communication hole which is formed in the central portion of the valve seat so as to allow the master cylinder side and wheel brake side to communicate with each other; and, a spherical-shaped valve body is disposed so as to face the valve seat. The valve body, when the normally-open-type electromagnetic valve is not in operation, is normally energized by the energizing force of a return spring in a direction where it is moved apart from the valve seat, and thus the communication hole is held in the open state. Thanks to this, in the braking operation, the brake fluid pressure is transmitted from the master cylinder through the communication hole to the wheel brake, thereby being able to brake the wheels of the vehicle.

Also, when maintaining the brake fluid pressure even after removal of the braking operation, an electromagnetic force is applied to the normally-open-type electromagnetic valve, the valve body is energized against the energizing force of the return spring in a direction where it is seated on the valve seat, and thus the valve body is pressed against the valve seat, thereby closing the normally-open-type electromagnetic valve. Due to the closed state of the normally-open-type electromagnetic valve, in the braking operation, the return of the brake fluid pressure from the wheel brake to the master cylinder can be prevented, which makes it possible to maintain the brake fluid pressure of the wheel brakes temporarily. Thus, the sudden start of the vehicle in a descending slope and the backing movement of the vehicle in an ascending slope can be prevented, thereby allowing the vehicle to start smoothly Also, in the brake fluid pressure maintaining operation due to the closed state of the normally-open-type electromagnetic valve, when the brake fluid pressure of the wheel brake is higher than necessary, the brake fluid pressure of the wheel brake is relieved to the master cylinder by a relief valve to thereby be able to restrict the dragging of the brake force in the time of the start of the vehicle. This conventional relief valve, normally, is closed by the energizing force of an energizing spring or the like, and can be opened against the energizing force only when the brake fluid pressure of the wheel brake is higher than the energizing force. And, in case where the normally-open-type electromagnetic valve is lowered down to a given value which can be determined by the energizing force of the energizing spring, the relief valve is closed again.

After closing of the relief valve, by returning the brake fluid pressure of the wheel brake to the master cylinder gradually through an orifice consisting of a minute recessed groove formed in a flow passage for the brake fluid pressure, not only can the vehicle be started smoothly but also the brake fluid pressure of the wheel brake can be lowered bit by bit down to the value of the brake fluid pressure that is indispensably necessary to help the start of the vehicle. By lowering the brake fluid pressure gradually in this manner, when the driver steps on an accelerator pedal, the backing movement of the vehicle in the ascending slope and the sudden start of the vehicle in the descending slope can be made hard to occur and also the dragging of the braking force can be restricted, thereby allowing the vehicle to start smoothly.

However, in the above related art, since the relief mechanism is structured in such a manner that the valve members and energizing spring are disposed in a narrow space within a movable core and the orifice is formed by working a recessed groove in the valve seat, the number of parts of the brake fluid pressure maintaining apparatus as well as the number of working and assembling steps thereof are large. Also, working of the recessed groove for use as an orifice requires high level of working accuracy and, at the same time, because the flow quantity of the brake fluid cannot be predicted, after manufacture of a product, the brake fluid must be actually made to flow in order to check the flow quantity of the brake fluid, which provides a limit on enhancement in the productivity. Also, according to the type of a vehicle, such as the weight of the vehicle on which the brake fluid pressure maintaining apparatus is to be mounted, the energizing force of the energizing spring of the relief valve and the depth of the orifice vary, which makes it necessary to set the specifications of a plurality of structures; that is, it is troublesome to manufacture the brake fluid pressure maintaining apparatus according to the above related art.

SUMMARY OF THE INVENTION

The present invention aims at eliminating the above-mentioned drawbacks found in the brake fluid pressure maintaining apparatus according to the above related art. Accordingly, it is an object of the present invention to provide a vehicle brake fluid pressure maintaining apparatus structured such that, separately from a check valve for allowing only the flow of the fluid pressure from a master cylinder to a wheel brake in a braking operation, there is disposed a normally-open-type electromagnetic valve which can be closed after removal of a braking operation to thereby maintain the brake fluid pressure of the wheel brake temporarily and, by adjusting the value of a current applied for energization of the normally-open-type electromagnetic valve, the brake fluid pressure of the wheel brake can be set arbitrarily in the brake fluid pressure maintaining operation of the normally-open-type electromagnetic valve. And, the normally-open-type electromagnetic valve is structured so as to have a relief function; that is, in case where the brake fluid pressure of the wheel brake is higher than the above-mentioned given value, the normally-open-type electromagnetic valve is opened to thereby escape the brake fluid pressure of the wheel brake to the master cylinder. Thanks to this relief function, the number of parts of the brake fluid pressure maintaining apparatus as well as the number of working and assembling steps thereof can be reduced, thereby being able to manufacture the brake fluid pressure maintaining apparatus simply at a low cost. Also, since the adjustment of the current value makes it possible to set the maintaining brake fluid pressure arbitrarily in the wheel brake, it is possible to provide a general-purpose vehicle brake fluid pressure maintaining apparatus which can be suitably used in all types of vehicles even in case they are different in weight from each other.

In attaining the above object, according to the present invention, there is provided a brake fluid pressure maintaining apparatus for a vehicle, having: a master cylinder for generating a brake fluid pressure when a driver steps on a brake pedal; a check valve interposed between the master cylinder and a wheel brake operatable by the brake fluid pressure from the master cylinder for allowing the flow of the brake fluid pressure from the master cylinder to the wheel brake in a braking operation; and, a normally-open-type electromagnetic valve closable in order to temporarily maintain the brake fluid pressure of the wheel brake even after removal of the braking operation, wherein the normally-open-type electromagnetic valve includes an electromagnetic coil for generating an electromagnetic force when a current is applied thereto, a fixed core to be immovably disposed, and a movable core to be attracted to the fixed core, and in the brake fluid pressure maintaining state, the normally-open-type electromagnetic valve is closed due to the electromagnetic force to thereby prevent the return of the brake fluid pressure from the wheel brake to the master cylinder and, in the brake fluid pressure no-maintaining state, the normally-open-type electromagnetic valve is always opened to thereby allow the flow of the brake fluid pressure from the master cylinder to the wheel brake or the return of the brake fluid pressure from the wheel brake to the master cylinder, and wherein the normally-open-type electromagnetic valve has the following relief function: by changing the value of the current to be applied to the electromagnetic coil, an attracting force for closing the normally-open-type electromagnetic valve is changed; by setting the attracting force at a given value, the brake fluid pressure to be maintained on the wheel brake side is set; and, when the normally-open-type electromagnetic valve is closed due to application of a current to the electromagnetic coil, in case where the brake fluid pressure of the wheel brake is higher than the attracting force of the given value, the normally-open-type electromagnetic valve is opened against the attracting force to thereby reduce the brake fluid pressure of the wheel brake down to the given value.

Also, the normally-open-type electromagnetic valve may also be structured such that, when it is closed, it reduces the brake fluid pressure of the wheel brake down to the given value and, after then, due to decreasing the value of the current to be applied to the electromagnetic coil gradually, reduces the attracting force gradually, thereby reduces the brake fluid pressure of the wheel brake gradually due variations in the attracting force.

Further, the normally-open-type electromagnetic valve may also be structured such that it decreases the attracting force due to gradually reducing the value of the current to be applied to the electromagnetic coil according to a previously set function.

Moreover, the normally-open-type electromagnetic valve may also be structured such that a recessed portion having a ring-shaped wall surface is formed in one of the mutually attracting surfaces of the fixed core and movable core, a projecting portion to be inserted into the recessed portion is formed in the other, the projecting portion is disposed so as to face the ring-shaped wall surface and, when the movable core is attracted by the fixed core, the projection portion can be inserted into the recessed portion and the ring-shaped wall surface can be situated on the outer periphery of the projection portion.

In addition, the check valve may also be a cup-type seal which is disposed on the outer periphery of the normally-open-type electromagnetic valve not only to separate the master cylinder side and wheel brake side from each other but also to allow only the flow of the brake fluid pressure from the master cylinder to the wheel brake but prevent the return of the brake fluid pressure from the wheel brake to the master cylinder.

The brake fluid pressure maintaining apparatus according to the present invention comprises a master cylinder for generating a brake fluid pressure and a wheel brake to be operated by the brake fluid pressure generated from the master cylinder and is structured in the above-mentioned manner; and, therefore, it can be applied to all types of vehicles which carry a motor thereon. By the way, the motor includes an internal combustion engine using gasoline or light oil, an external combustion engine such as a Stirling engine, and a motor using electricity. Also, the vehicle includes an MT vehicle carrying a manually-operated transmission, an AT vehicle carrying an automatic transmission, and a CVT vehicle carrying a continuously variable transmission. The brake fluid pressure maintaining apparatus for a vehicle according to the present invention can be applied to all of these vehicles.

And, according to the brake fluid pressure maintaining apparatus for a vehicle according to the present invention, since the normally-open-type electromagnetic valve used to maintain the brake fluid pressure is structured so as to have a relief function, there is eliminated the need for provision of a separate relief mechanism that is necessary in the related art, thereby being able to reduce the number of parts of the brake fluid pressure maintaining apparatus as well as the number of working and assembling steps thereof. Also, by changing the value of the current to be applied to the fixed core, the attracting force for attracting the movable core in the fixed core direction and the brake fluid pressure to be maintained on the wheal brake side can be adjusted arbitrarily in such manner that it can be increased or decreased. This can avoid the need for setting of a plurality of structure specifications according to the types of vehicles differing in weight as in the related art and, therefore, there can be obtained a general-purpose product which can be used to any type vehicle.

Next, description will be given below of the operation of the brake fluid pressure maintaining apparatus for a vehicle according to the present invention in the running operation of the vehicle with reference to a case in which, for example, the vehicle is caused to stop temporarily on an ascending slope in order to watch for the signal to change to green. When it is not necessary to maintain the brake fluid pressure of the wheel brake, the normally-open-type electromagnetic valve is open. And, in order to stop the vehicle temporarily on the ascending slope, the driver steps on the brake pedal to thereby execute a braking operation and also maintains the stepping force on the brake pedal so as to be able to prevent the vehicle from backing due to its own dead weight.

Due to this braking operation, the brake fluid pressure generated in the interior of the master cylinder, involving the flow of the brake fluid, passes through the check valve, which is disposed through the pipe of the brake fluid separately from the normally-open-type electromagnetic valve, as well as through the normally-open-type electromagnetic valve that is held in the open state, and is then transmitted to the wheel brake. The transmission of the brake fluid pressure generates the braking forces of the wheels to thereby be able to stop the vehicle on the ascending slope.

In case where the stop of the vehicle is detected, the normally-open-type electromagnetic valve is closed to thereby be able to temporarily maintain the brake fluid pressure to be applied to the wheel brake. Due to the closing operation of the normally-open-type electromagnetic valve, the electromagnetic coil of the normally-open-type electromagnetic valve is energized to thereby generate an electromagnetic attracting force between the fixed and movable cores; and, because of the attracting force, the movable core is moved in the approaching direction to the fixed core to thereby close the normally-open-type electromagnetic valve. Also, not only because the check valve does not allow the return of the brake fluid pressure from the wheel brake to the master cylinder but also because, as described above, the normally-open-type electromagnetic valve is closed, the brake fluid pressure of the wheel brake is maintained; and, therefore, even on the ascending slope, the backing motion of the vehicle can be prevented, which makes it possible to hold the stopping state of the vehicle.

As described above, even when the normally-open-type electromagnetic valve is held closed in the case where the driver increases the stepping force on the brake pedal, the brake fluid pressure from the master cylinder is transmitted through the check valve to the wheel brake to thereby be able to increase the braking force.

Next, to start the vehicle on the ascending slope, the driver releases the foot from the brake pedal and steps on the accelerator pedal. During the time from the release of the brake pedal to the stepping on the accelerator pedal, the electromagnetic force is continuously in operation and the normally-open-type electromagnetic valve is held closed and, therefore, even when the driver releases the foot from the brake pedal, the brake fluid pressure of the wheel brake can be maintained, which can prevent the vehicle from backing on the ascending slope.

In case where the driver steps on the brake pedal more strongly than necessary, the brake fluid pressure of the wheel brake can be excessively higher than a previously set given brake fluid pressure due to the above-mentioned attracting force. In this case, the relief function of the normally-open-type electromagnetic valve is put into operation. When the relief function is in operation, the normally-open-type electromagnetic valve receives the brake fluid pressure of the wheel brake higher than the attracting force and is thereby opened against the attracting force, so that the brake fluid pressure of the wheel brake is returned to the master cylinder. Thanks to this return of the brake fluid pressure, the brake fluid pressure of the wheel brake can be lowered down to the given value. Also, in the case where the brake fluid pressure is lowered down to the given value, the attracting force is put into operation again to thereby close the normally-open-type electromagnetic valve, the brake fluid pressure of a given value can be maintained on the wheel brake side.

And, in case where the driver steps on the accelerator pedal, the drive force for starting the vehicle increases gradually, which allows the vehicle to start on the ascending slope. In this vehicle start, as described above, the braking force which can prevent the large backing motion of the vehicle is maintained on the wheel brake side by the brake fluid pressure maintaining apparatus for a vehicle according to the present invention and also this braking force, due to the relief function, is such an excessively large brake force that can prevent the start of the vehicle. Therefore, there is eliminated the need for use of a wasteful drive force caused by the dragging of the braking force and also the large backing motion of the vehicle is hard to occur, which makes it possible to start the vehicle smoothly and quickly Also, after start of the vehicle in the case where the electromagnetic coil is deenergized to thereby remove the attracting force, the normally-open-type electromagnetic valve is opened and the brake fluid pressure remaining in the wheel brake returns at a burst to the master cylinder through the normally-open-type electromagnetic valve that is held open, which can reduce the dragging of the brake and thus can start the vehicle smoothly. Also, the opening operation of the normally-open-type electromagnetic valve may be executed at the same time when the driver steps on the accelerator pedal, or, as a fail safe action, may be carried out in a given period of time after the driver steps on the accelerator pedal, or may be performed at the time when the vehicle reaches a given speed in order to be able to reduce the unnecessary dragging of the brakes.

In case where the brake fluid pressure retaining apparatus is structured such that, during the time when the driver releases the foot from the brake pedal and steps on the accelerator pedal, the brake fluid pressure of the wheel brake can be maintained, the driver is able to start the vehicle on the ascending slope easily. And, not only in the case of the MT vehicle, but also in the case of the AT vehicle and CVT vehicle in which an engine stops when the vehicle stops so as to prevent a creep phenomenon or an idling operation, a proper braking force can be maintained during the time when the engine is put into operation again due to release of the foot from the brake pedal to thereby generate a creep force, the backing motion of the vehicle can be prevented and thus the smooth start of the vehicle on the ascending slope is possible.

Next, description will be given below of a case in which the vehicle is caused to stop and start on a descending slope. That is, to stop the vehicle on the descending slope, the driver, similarly to the case of the ascending slope, steps on the brake pedal to increase the brake fluid pressure of the wheel brake and thus generate a braking force, thereby causing the vehicle to stop. In this case, in the brake fluid pressure maintaining apparatus, due to various conditions including the stop of the vehicle, similarly to the case of the ascending slope, there is operated an electromagnetic force to thereby generate an attracting force, so that the normally-open-type electromagnetic valve is closed. Because of the maintenance of the closed state of the normally-open-type electromagnetic valve and the maintenance of the stepping on the brake pedal, the brake fluid pressure of the wheel brake can be maintained, thereby being able to maintain the stop of the vehicle on the descending slope.

And, in order to start the vehicle on the descending slope, the driver releases the foot from the brake pedal. In the descending slope, the driver does not step on the accelerator pedal; and, in the case of the MT vehicle, while stepping on the clutch pedal with the start clutch left cut off, the driver is going to run the vehicle downward on the descending slope; and in the case of the AT vehicle and CVT vehicle, the driver is going to run the vehicle downward while making use of a creep phenomenon and the dead weight of the vehicle. In a state where the brake pedal is released and the accelerator pedal is not stepped on in this manner, the closed state of the normally-open-type electromagnetic valve is maintained and the brake fluid pressure of the wheel brake is maintained to thereby prevent the vehicle from running downward on the descending slope suddenly, so that the stopping state of the vehicle can be maintained.

However, even in the case where the normally-open-type electromagnetic valve is closed, by releasing the foot from the brake pedal or by loosening the stepping force on the brake pedal, the relief function of the normally-open-type electromagnetic valve is put into operation to thereby reduce the brake fluid pressure of the wheel brake down to a given value. The reduction of the brake fluid pressure reduces the dragging of the brake and, therefore, even in the case where the driver does not step on the accelerator pedal, the vehicle is allowed to move downward gradually on the descending slope, which makes it possible for the vehicle to start smoothly on the descending slope. Also, not only in the case of the start on the descending slope but also in the case of the start on the flat road, the temporary maintaining function of the brake fluid pressure after removal of the braking operation can prevent the sudden start of the vehicle, which makes it possible for the vehicle to start smoothly.

Also, in the case of the normally-open-type electromagnetic valve according to the present invention, the attracting force can be set by adjusting the value of the current to be applied to the electromagnetic coil and thus the brake fluid pressure to be maintained on the wheel brake side can beset arbitrarily. This operation can be used in the following manner: that is, after the brake fluid pressure on the wheel brake side is lowered down to a given value when the normally-open-type electromagnetic valve is closed, the value of the current to be applied to the electromagnetic coil is reduced gradually to thereby decrease the attracting force gradually; and, in case where the brake fluid pressure on the wheel brake side is reduced gradually due to the variations in the attracting force, the relief function of the normally-open-type electromagnetic valve can further include the return function of the brake fluid pressure as in the conventional orifice, so that the number of parts of the brake fluid pressure maintaining apparatus as well as the number of working and assembling steps thereof can be reduced further.

Further, the conventional orifice composed of a recessed groove relieves the brake fluid pressure of the wheel brake due to a difference between the brake fluid pressures of the wheel brake and master cylinder, but cannot adjust the reducing speed of the brake fluid pressure of the wheel brake arbitrarily. And also, since working accuracy is required of the orifice, after production, every product must be checked for the flow quantity and speed of the brake fluid pressure thereof. However, according to the normally-open-type electromagnetic valve of the present invention, by changing the attracting force, the return function included in the relief function is actuated to thereby be able to reduce the brake fluid pressure gradually. Thanks to this, even in case where no orifice is formed in the normally-open-type electromagnetic valve, the normally-open-type electromagnetic valve is allowed to have a function corresponding to that of the orifice and also the reducing speed of the brake fluid pressure can be set the same in all products to thereby be able to save the checking step and the like.

And, the gradual reduction of the brake fluid pressure due to the return function not only can prevent the backing motion of the vehicle but also can reduce the brake fluid pressure of the wheel brake bit by bit smoothly down to the minimum brake fluid pressure necessary for help of start or the vehicle. That is, in the case of the ascending slope, while preventing the large backing motion of the vehicle, the dragging of the braking force can be reduced to thereby allow the smooth start of the vehicle; and, in the case of the descending slope, even in case where the driver does not step on the accelerator pedal, the vehicle goes down gradually on the descending slope due to its own dead weight, which makes it possible for the vehicle to start smoothly.

Also, the above-mentioned rate, in which the value of the current to be applied to the electromagnetic coil is gradually reduced to thereby decrease the attracting force gradually, may be carried cut irregularly; however, in case where the current value is gradually lowered according to a previously set function to thereby reduce the brake fluid pressure regularly, not only the brake force of the wheel brake can be gripped positively to thereby be able to facilitate the execution of various kinds of control in the vehicle starting time, but also the reduction of the braking force can be made smooth, which can realize the smooth start of the vehicle. Also, referring to the function, a linear function may be used to reduce the brake fluid pressure in a linear manner, or a quadratic function may be used to reduce the brake fluid pressure in a curved line manner. Further, according to the starting conditions such as the ascending or descending slope and flat road, these functions may be selected properly to thereby control the brake fluid pressure.

Also, in the above-mentioned normally-open-type electromagnetic valve, the mutually attracting surfaces of the fixed and movable cores may be formed in a flat surface. However, since the attracting force acting between the fixed and movable cores is in inverse proportion to the distance from the fixed core, in order to move the movable core situated most distant from the fixed core in the fixed core direction, an electromagnetic force is necessary which is large to a certain degree. Therefore, a recessed portion including a ring-shaped wall surface is formed in one of the mutually attracting surfaces of the fixed and movable cores, a projecting portion to be inserted into the recessed portion is formed in the other, and the fixed and movable cores are arranged in such a manner that the projecting portion faces the ring-shaped wall surface. And, the fixed and movable cores may be disposed such that, when the movable core is attracted by the fixed core, the projecting portion of the fixed or movable core can be inserted into the recessed portion and the ring-shaped wall surface can be situated on the outer periphery of the projecting portion.

According to the above structure in which the recessed portion and projecting portion are formed in the mutually attracting surfaces of the fixed and movable cores so as to be adjacent to each other, even in case where the fixed and movable cores are most distant from each other, a magnetic path can be sent and received between the recessed and projecting portions and thus the attracting force is hard to lower, which makes it easy to control the normally-open-type electromagnetic valve. Also, as described above, due to the return function of the relief function, even in case where the value of the current to be applied to the electromagnetic coil is reduced, the normally-open-type electromagnetic valve is easy to control. And, preferably, the fixed and movable cores may be disposed such that the leading end of the projecting portion can be inserted slightly into the recessed portion.

Also, any conventional check valve may be used to transmit the brake fluid pressure to the wheel brake from the master cylinder according to the stepping force on the brake pedal. However, for example, in the case of a cup-type seal which allows only the flow of the brake fluid pressure from the master cylinder to the wheel brake but prevents the return of the brake fluid pressure from the wheel brake to the master cylinder, the check valve can have a simple structure and can be installed easily, so that the brake fluid pressure maintaining apparatus can be made simple and compact.

BRIEF DESCRIPTION OF THE PREFERRED EMBODIMENTS

Figure 1:
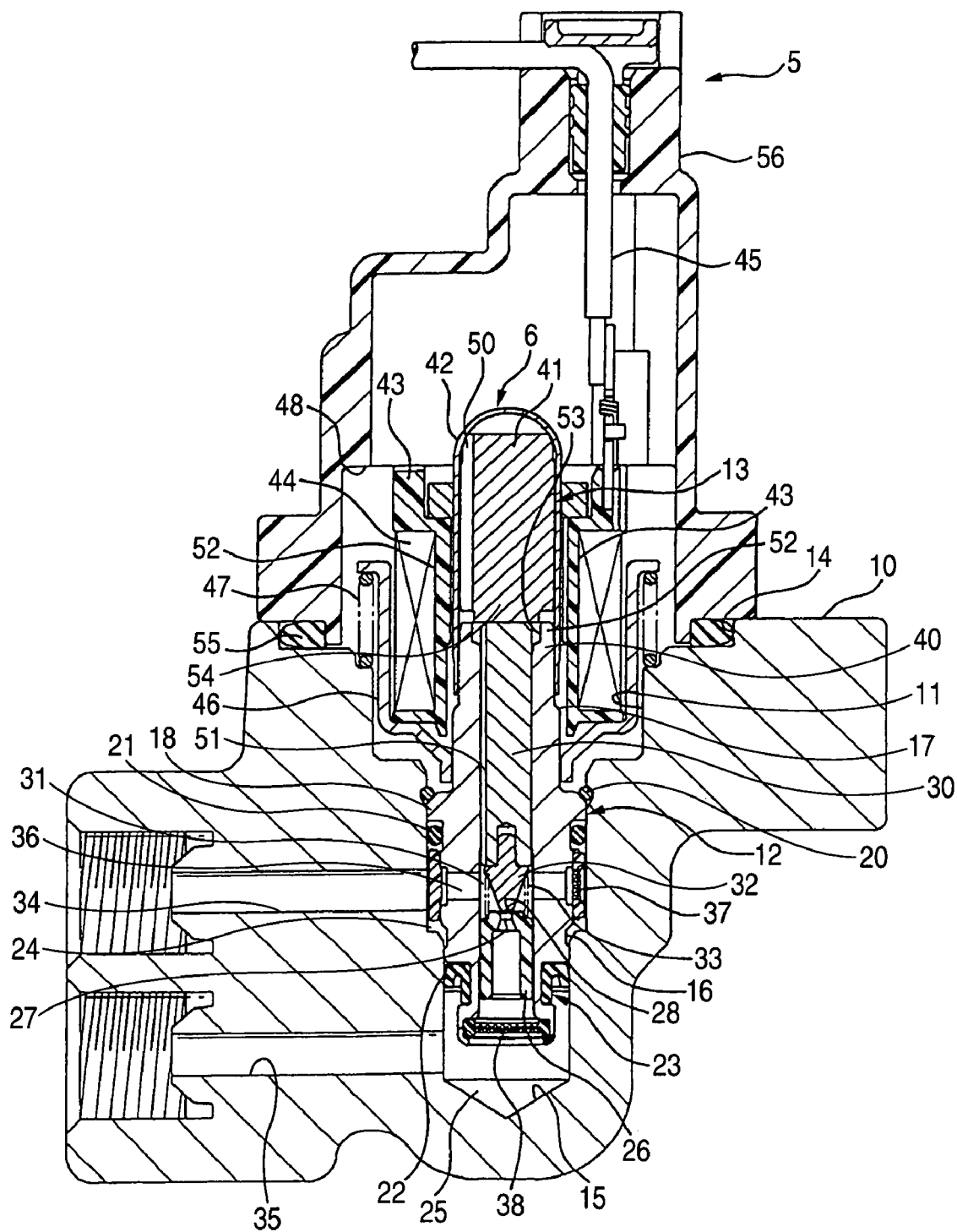
FIG. 1 is a section view of the whole structure of a first embodiment of a brake fluid pressure maintaining apparatus according to the present invention.
Figure 2:
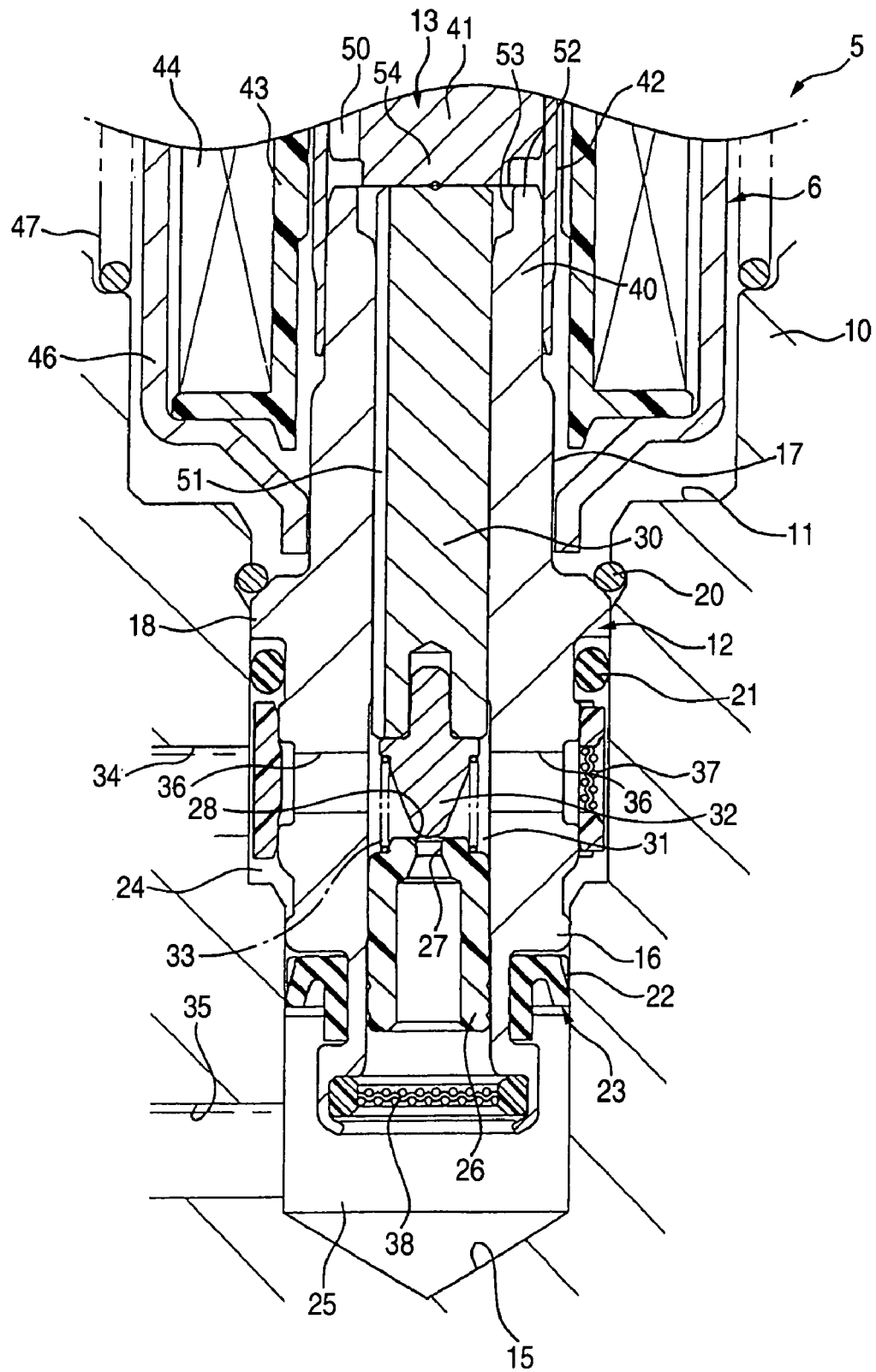
FIG. 2 is an enlarged section view of the valve neighboring portion of FIG. 1, showing a state in which a normally-open-type electromagnetic valve is open.
Figure 3:
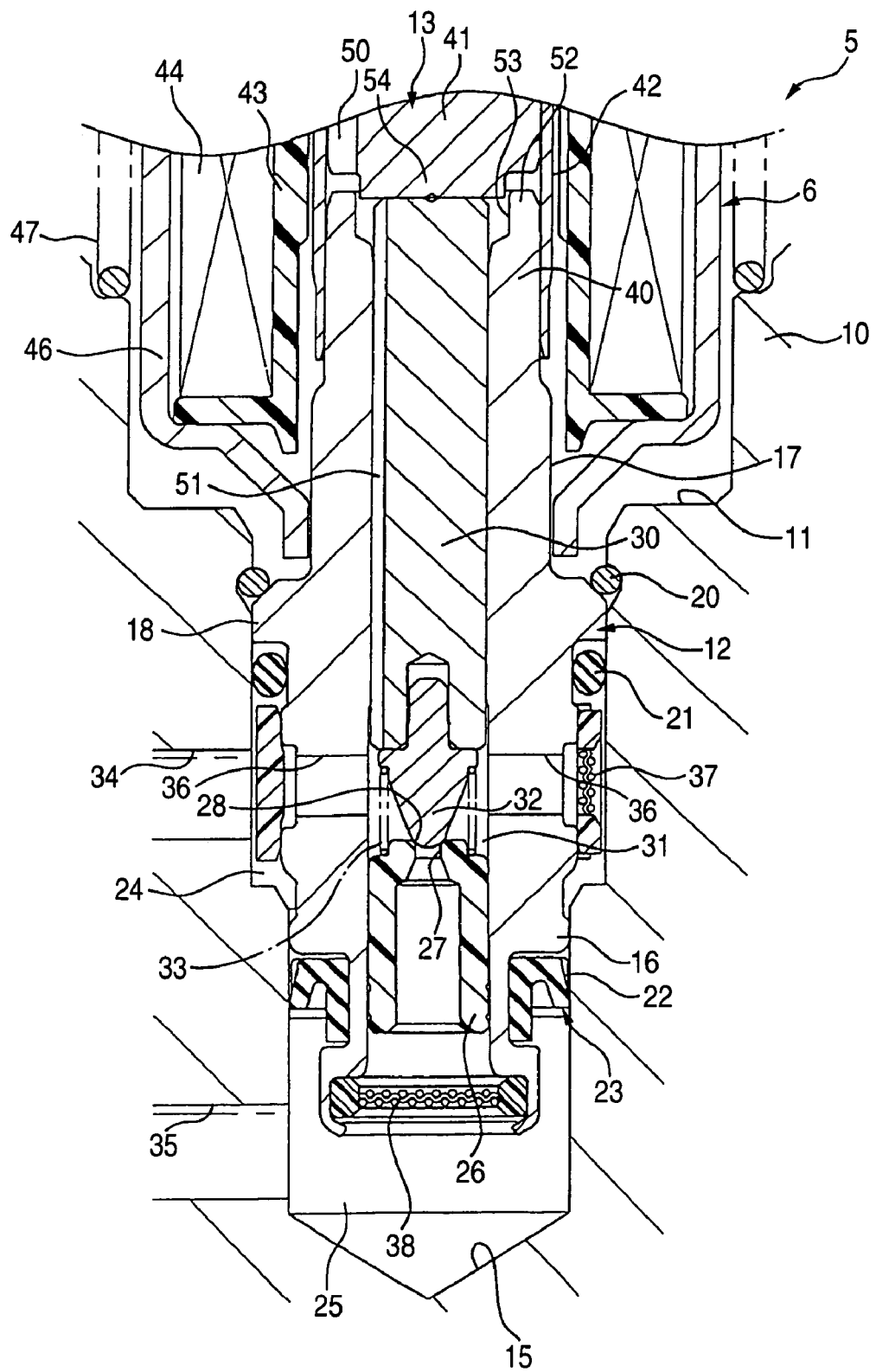
FIG. 3 is an enlarged section view of the valve neighboring portion, showing a state in which the normally-open-type electromagnetic valve is closed.
Figure 4:
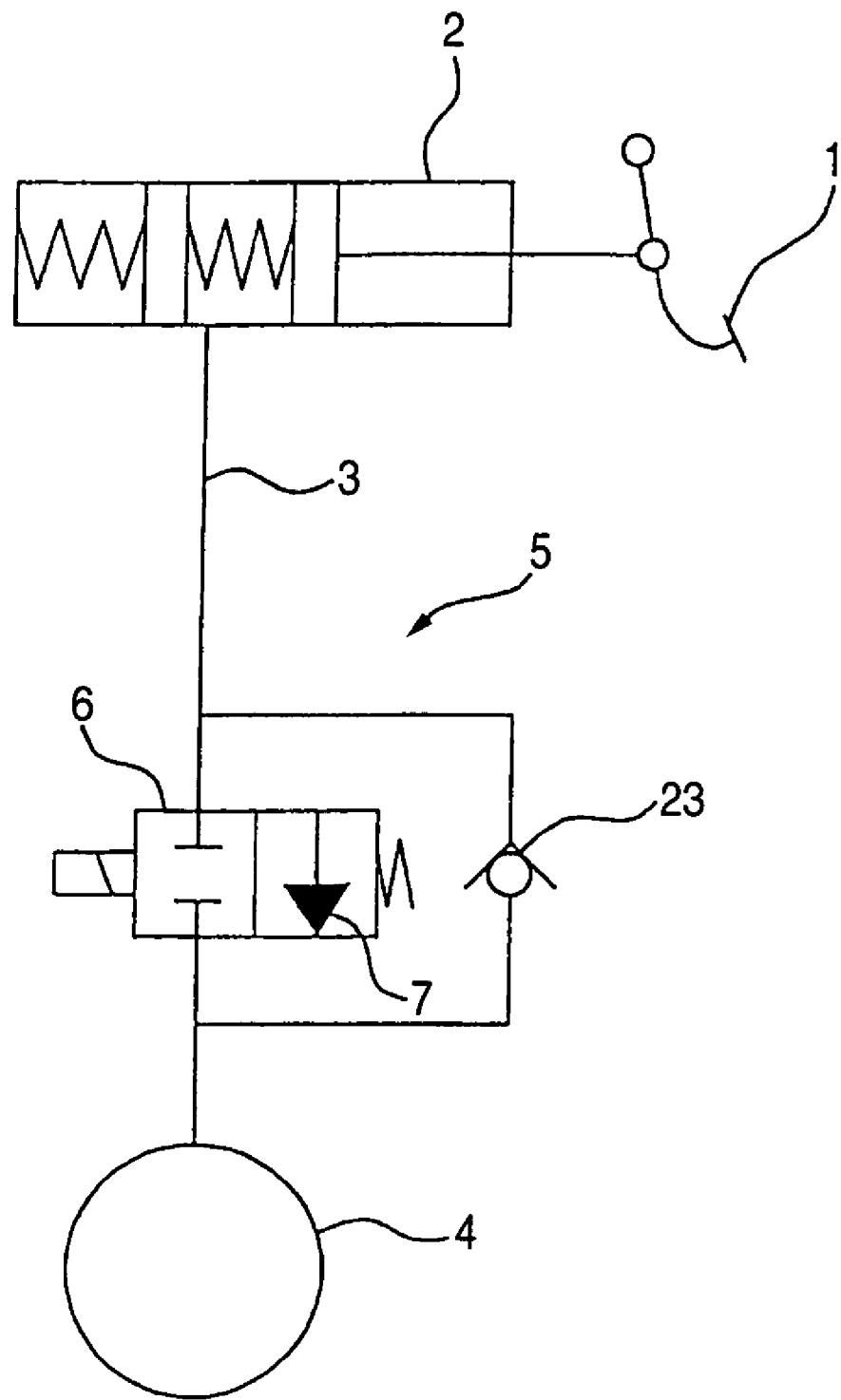
FIG. 4 is a structure view of a brake apparatus incorporating a brake fluid pressure maintaining apparatus therein; and, FIG. 5 is a control time chart in the running time or a vehicle incorporating a brake fluid pressure maintaining apparatus.
Figure 5:
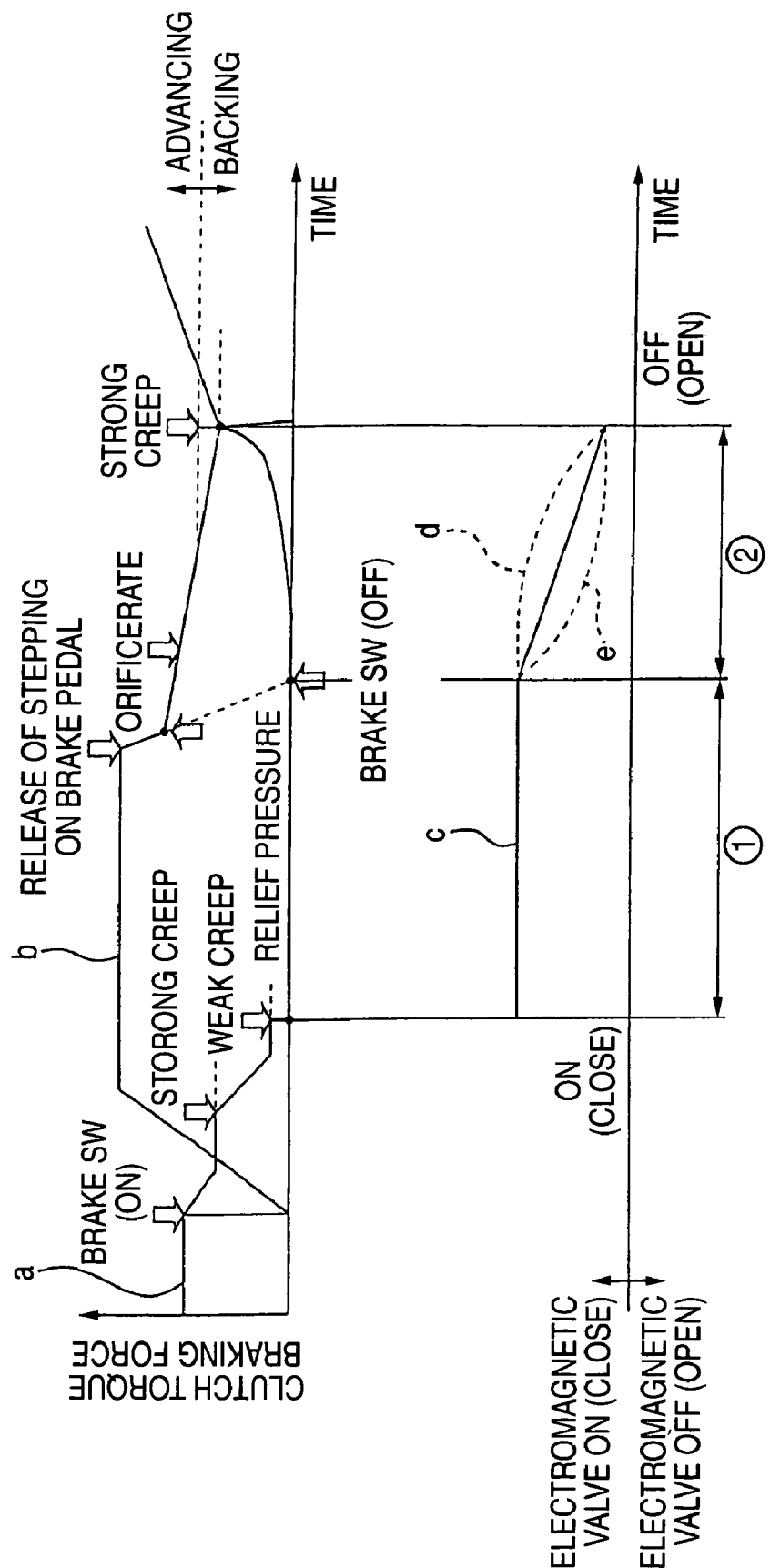

Now, description will be given below in detail of an embodiment of a brake fluid pressure maintaining apparatus for use in a vehicle with reference to the accompanying drawings. FIG. 1 is a section view of the whole structure of the present brake fluid pressure maintaining apparatus for a vehicle, showing a state in which a normally-open-type electromagnetic valve is open. FIG. 2 is an enlarged section view of the valve portion neighboring portion of FIG. 1. Also, FIG. 3 is an enlarged section view of the portion shown in FIG. 2, showing a state in which the normally-open-type electromagnetic valve is closed and thus the brake fluid pressure is maintained. FIG. 4 is a structure view of a brake apparatus incorporating therein a brake fluid pressure maintaining apparatus according to the present invention. FIG. 5 is a time chart for controlling a braking operation and a starting operation in the running operation of a vehicle incorporating therein a brake fluid pressure maintaining apparatus according to the present invention.

Firstly, referring to the structure view shown in FIG. 4, reference character (1) designates a brake pedal; and, between a master cylinder (2) for generating the brake fluid pressure when a driver steps on the brake pedal (1) and a wheel brake (4) for braking the vehicle due to the brake fluid pressure transmitted thereto through a pipe (3) from the master cylinder (2), there is connected and interposed a brake fluid pressure maintaining apparatus (5) according to the present embodiment. The brake fluid pressure maintaining apparatus (5) comprises a check valve (23) which, in the braking operation, allows the brake fluid pressure to flow from the master cylinder (2) to the wheel brake (4), and a normally-open-type electromagnetic valve (6) which, even after removal of the braking operation, can be closed so as to temporarily maintain the brake fluid pressure of the wheel brake (4). This normally-open-type electromagnetic valve (6) has not only a brake fluid pressure maintaining function but also a relief mechanism (7) which, when the brake fluid pressure of the wheel brake (4) is excessively high, returns the brake fluid pressure of the wheel brake (4) to the master cylinder (2).

Now, describing the structure of the brake fluid pressure maintaining apparatus (5) with reference to FIGS. 1 to 3, reference character (10) designates a block-like support body made of an aluminum alloy or the like; and, within a stepped mounting hole (11) recessedly formed in one surface of the support body (10), there is stored a normally-open-type electromagnetic valve (6) which is composed of a valve part (12) and a solenoid part (13). In the present specification, the opening part (14) side of the mounting hole (11) is regarded as the upward side, while the bottom part (15) side is regarded as the downward side.

Firstly, the valve part (12) of the normally-open-type electromagnetic valve (6) includes a housing (16) which can be fitted into the mounting hole (11). This housing (16) is formed as a stepped cylindrical shape including a small-diameter portion (17) and a large-diameter portion (18) and is made of magnetic metal, so that the housing (16) can function as a fixed core (40) which will be discussed later. And, the housing (16) is irremovably fixed to the support body by a ring-shaped clip (20) which is mounted between the outer periphery of the large-diameter portion (18) and the inner periphery of the mounting hole (11).

Referring further to the structure of the housing (16), a seal member (21) ouch as an O ring is mounted on the outer periphery of the large-diameter portion (18) to thereby seal the bottom part (15) side of the mounting hole (11), while a cup-type seal (22) is mounted on the outer periphery of the large-diameter portion (18) with a clearance with respect to the seal member (21) in the axial direction thereof. This cup-type seal (22) allows only the flow of the brake fluid pressure from the wheel brake (4) to the master cylinder (2) but prevents the return of the brake fluid pressure from the wheel brake (4) to the master cylinder (2); that is, the cup-type seal (22) operates as a check valve (23). Thanks to the above structure, between the seal member (21) and cup-type seal (22), there is formed one ring-shaped fluid pressure chamber (24) between the support body (10) and large-diameter portion (18); and, there is formed the other fluid pressure chamber (25) between the cup-type seal (22) and mounting hole (15).

Referring again to the structure of the housing (16), a cylindrical-shaped valve seat member (26) is mounted on and fixed to the interior of the lower end side of the large-diameter portion (18). In the interior of the valve seat member (26), there is formed a valve hole (27) in the axial direction thereof; and, on the upper end side of the valve seat member (26), there is disposed a tapered valve seat (28) in the central portion of which the valve hole (27) is opened.

On the other hand, in the interior of the housing (16), there is mounted a valve shaft (30) made of non-magnetic material in such a manner that it can be slid in the axial direction; and, between the valve shaft (30) and valve seat member (26), in the interior of the housing (16), there is formed a valve chamber (31) so as to face the valve seat (28). And, within the valve chamber (31), to the lower end of the valve shaft (30), there is fixed an inverted-conical-shaped valve body (32) which can be seated on the tapered valve seat (28). Further, within the valve chamber (31), between the valve seat member (26) and valve shaft (30), there is interposed a valve-opening energizing spring (33) which pressure energizes the valve shaft (30) in the opposite direction to the valve seat member (26); and, normally, the valve body (32) is separated from the valve seat (28) and the valve hole (27) is opened due to the pressure energizing force of the valve-opening energizing spring (33).

And, on the support body (10), there are disposed a master-side fluid pressure passage (34) which communicates with the master cylinder (2), and a wheel-side fluid pressure passage (35) communicating with the wheel brake (4). Also, the master-side fluid pressure passage (34) and one fluid pressure chamber (24) are formed so as to be communicatable with each other; and, in the wall surface of the large-diameter portion (18), there are opened up a plurality of tube-shaped communication passages (36) allowing one fluid pressure chamber (24) and valve chamber (31) to communicate with each other, whereby the master-side fluid pressure passage (34) and valve chamber (31) are allowed to communicate with each other. And, a filter (37) for filtering the brake fluid is mounted on the outer periphery of the large-diameter portion (18) including the communication passages (36) within one fluid pressure chamber (24); and, through the filter (37), there can be transmitted the brake fluid pressure between one fluid pressure chamber (24), master-side fluid pressure passage (34) and valve chamber (31).

On the other hand, in the case of the other fluid pressure chamber (25), a filter (38) for filtering the brake fluid pressure is mounted on the lower end or the housing (16) to be disposed within the other fluid pressure chamber (25); and, through the filter (38) and other fluid pressure chamber (25), the wheel-side fluid pressure passage (35) is allowed to communicate with the interior of the valve seat member (26).

On the other hand, the solenoid part (13) of the normally-open-type electromagnetic valve (6) comprises a fixed core (40) disposed on the upper end of the small-diameter portion (17) of the housing (16) made of magnetic material, a movable care (41) which can be contacted with the upper end of the valve shaft (30) of the valve part (12) to thereby press and move the valve shaft (30) in the valve closing direction, a guide tube (42) which is connected and fixed to the upper end of the fixed core (40) to guide the approaching and parting movements of the movable core (41) with respect to the fixed core (40), a bobbin (43) disposed so as to face the guide tube (42) and the outer periphery of the fixed core (40); an electromagnetic coil (44) wound around the outer periphery of the bobbin (43), a conductor (45) connected to the electromagnetic coil (44) for supplying a current to the electromagnetic coil (44), a yoke part (46) for covering the electromagnetic coil (44), and a yoke spring (47) interposed between the yoke part (46) and support body (10).

The movable core (41) is formed in a cylindrical shape and is disposed so as to be contactable with the upper end of the valve shaft (30) concentrically mounted on the housing (16); and, when the normally-open-type electromagnetic valve (6) is not in operation, due to the pressure energizing force of the valve-opening energizing spring (33) mounted in the valve chamber (31) of the valve part (12), the movable core (41) is energized through the valve shaft (30) in the direction where it is moved apart from the fixed core (40). Also, the guide tube (42) for guiding the movement of the movable core (41) is made of non-magnetic material such as stainless steel and is formed in a thin bottomed cylindrical shape including a closed end formed so as to have a semi-spherical shape, while the open end thereof is fixed to the outer periphery of the upper end portion of the housing (16) by welding or by other similar means.

Also, in order to prevent a pressure difference from being generated between the interior of the housing (16) and the interior of the guide tube (42) due to the movement of the movable core (41), in each of the outer peripheral surfaces of the movable core (41) and valve shaft (30), there is or are recessedly formed one or more flow groove(s) (50) (51) in the axial direction thereof. Such flow grooves (50) (51) allow the brake fluid to flow freely between the housing (16) and guide tube (42), which can prevent the generation of the pressure difference between the interiors of the housing (16) and guide tube (42), thereby permitting the smooth movements of the movable core (41) and valve shaft (30).

Also, the fixed core (40) includes a recessed portion (53) which is formed by recessing the attracting surface of the fixed core (40) in a cylindrical shape and also which has a vertical ring-shaped wall surface (52); and, in the attracting surface of the movable core (41), there is provided a cylindrical-shaped projecting portion (54) which can be inserted into the recessed portion (53). And, the projecting portion (54) of the movable core (41) is disposed so as to face the recessed portion (53) of the fixed core (40) and, preferably, they may be disposed in such a manner that, in a state where the fixed core (40) and movable core (41) are most distant from each other with no attracting force applied between them, the leading end of the projecting portion (54) can be slightly inserted into the recessed portion (53).

And, the projecting portion (54) and recessed portion (53) are also disposed such that, when there is generated an attracting force between the fixed core (40) and movable core (41) due to energization of the electromagnetic coil (44) and the movable core (41) is thereby moved in the approaching direction to the fixed core (40), the projecting portion of the movable core (41) can be inserted into the recessed portion (53) of the fixed core (40) and the ring-shaped wall surface (52) can be disposed on the outer periphery of the projecting portion (54). According to the present structure, when compared with a structure in which the attracting surfaces of the fixed core (40) and movable core (41) are formed as flat surfaces, even in case where the fixed core (40) and movable core (41) are most distant from each other, a magnetic path can be delivered and received between the recessed portion (53) and projecting portion (54) and thus their mutually attracting forces are difficult to lower, so that the approaching movement of the movable core (41) in the direction of the fixed core (40) can be carried out with good efficiency.

Also, on the opening (14) of the support body (10), there is mounted through a seal member (55) a protecting cover (56) formed of non-magnetic resin material, thereby covering and protecting the solenoid part (13). And, as shown in FIG. 1, due to the pressure energizing force of the yoke spring (47), the bobbin (43) is contacted with and fixed to the inner wall (48) of the protecting cover (56) through the yoke part (46), whereby the solenoid part (13) is fixed to the support body (10). Also, the conductor (45) is penetrated through the protecting cover (56) and is connected to the electromagnetic coil (44).

When the brake fluid pressure is not maintained, the normally-open-type electromagnetic valve (6) is deenergized and thus no attracting force is generated between the fixed core (40) and movable core (41); and, due to the pressure energizing force of the valve opening energizing spring (33) mounted in the valve chamber (31) of the valve part (12), the movable core (41) is pressed and energized in the parting direction from the fixed core (40) through the valve shaft (30) and, at the same time, the valve body (32) is separated from the valve seat (28) to thereby open the valve hole (27), so that the normally-open-type electromagnetic valve (6) is held in the open state thereof.

And, when the brake fluid pressure is maintained, in case where a current is allowed to flow in the electromagnetic coil (44), there is generated an attracting force which moves the movable core (41) in the approaching direction to the fixed core (40). This attracting force is set so as to exceed the energizing force of the valve opening energizing spring (33) which is used to press an energize the valve body (32) in the valve opening direction. In case where the movable core (41) is moved in the approaching direction to the fixed core (40) due to this attracting force against the energizing force of the valve opening energizing spring (33), the valve body (32) can be seated on the valve seat (28) through the valve shaft (30) to thereby close the valve hole (27), so that the normally-open-type electromagnetic valve (6) can be closed.

Also, according to the operation of the normally-open-type electromagnetic valve (6), by changing the value of the current to be applied to the electromagnetic coil (44), it is possible to change the attracting force that is generated between the fixed core (40) and movable core (41), so that the brake fluid pressure to be maintained by the wheel brake (4) can be set at a given value arbitrarily. In view of this operation, in the normally-open-type electromagnetic valve (6), there is disposed a relief mechanism (7) which, in the brake fluid pressure maintaining state, when the brake fluid pressure of the wheel brake (4) is higher than the above-mentioned given value, allows the brake fluid pressure to return from the wheel brake (4) to the master cylinder (2). Also, the relief mechanism (7) also has a return function which, as in the conventional orifice, allows a slight amount of brake fluid pressure to return from the wheel brake (4) to the mast r cylinder (2) to thereby lower gradually the brake fluid pressure of the wheel brake (4).

Now, description will be given here of the control of the relief mechanism (7). Firstly, in order to maintain the brake fluid pressure after removal of the braking operation, in case where there is generated a given attracting force due to application of a current to the electromagnetic-coil to thereby close the normally-open-type electromagnetic valve (6), the movable core (41) is moved in the approaching direction to the fixed core (40) against the pressure energizing force of the valve opening energizing spring (33). Due to the approaching movement of the movable core (41) to the fixed core (40), the valve body (32) is pressed and moved in the valve seat (28) direction through the valve shaft (30), the valve body (32) is seated on the valve seat (28) to thereby close the valve hole (27), and thus the normally-open-type electromagnetic valve (6) is closed. Because of the closed state of the normally-open-type electromagnetic valve (6), even after removal of the braking operation, the brake fluid pressure of the wheel brake (4) can be maintained.

However, when the brake fluid pressure of the wheel brake (4) is higher than the brake fluid pressure of a given value to be set by the above-mentioned attracting force, the valve body (32) is separated from the valve seat (28) by this high brake fluid pressure against the attracting force to thereby open the valve hole (27), so that the normally-open-type electromagnetic valve (6) is opened. Therefore, the brake fluid pressure of the wheel brake (4) is returned through the valve hole (27) to the master cylinder (2), thereby causing the brake fluid pressure of the wheel brake (4) to lower. And, in case where the brake fluid pressure of the wheel brake (4) lowers down to the given value, the attracting force of the normally-open-type electromagnetic valve (6) is allowed to operate; and, therefore, the movable core (41) is moved in the approaching direction to the fixed core (40), the valve body (32) is seated on the valve seat (28) and the valve hole (27) is closed to thereby close the normally-open-type electromagnetic valve (6), so that the wheel brake (4) is able to maintain the brake fluid pressure of a given value.

Next, description will be given below of the return function or the brake fluid pressure that is provided in the relief mechanism (7). That is, in case where, after the brake fluid pressure of the wheel brake (4) is lowered down to the given value under the control of the relief mechanism (7), the value of a current to be applied to the electromagnetic coil (44) is slightly lowered to thereby slightly reduce the attracting force acting on the movable core (41), the brake fluid pressure of the wheel brake (4) becomes higher than the attracting force that can close the normally-open-type electromagnetic valve (6), and the high brake fluid pressure of the wheel brake (4) acts on the seal surface, so that the valve body (32) is separated from the valve seat (28) against the attracting force to thereby open the valve hole (27), so that the normally-open-type electromagnetic valve (6) is opened. Thanks to the opened state of the normally open-type electromagnetic valve (6), the brake fluid pressure of the wheel brake (4) is returned through the valve hole (27) to the master cylinder (2), thereby being able to lower the brake fluid pressure of the wheel brake (4) than the above given value. Therefore, by gradually lowering the current value to reduce the attracting force little by little, the brake fluid pressure of the wheel brake (4) can be lowered down gradually. Also, since the recessed and projecting portions are formed in the mutual attracting surfaces of the fixed core (40) and movable core (41) to thereby make it difficult for the lowered attracting force to occur, even in case where the value of the current to be applied to the electromagnetic coil (44) is reduced bit by bit for the purpose of the return function, the normally-open-type electromagnetic valve (6) is easy to control.

Now, description will be given below of the operation of the above-structured brake fluid pressure maintaining apparatus (5) with reference to operation views shown in FIGS. 1 to 3 as well as a control time chart shown in FIG. 5. Firstly, a time chart shown in the upper stage of FIG. 5 shows variations in the clutch torque (drive force) of a vehicle and in a brake force respectively in time series. In FIG. 5, a graph a shows the clutch torque, while a graph b shows the brake force. Also, a graph c of a time chart shown in the lower stage of FIG. 5 shows the open and closed states of the normally-open-type electromagnetic valve (6) through the values of the current to be applied to the normally-open-type electromagnetic valve (6). Specifically, a state, in which the normally-open-type electromagnetic valve (6) is deenergized and is thereby opened, is regarded-as electromagnetic valve OFF (Open); whereas, a state, in which the normally-open-type electromagnetic valve (6) is energized and is thereby closed, is regarded as electromagnetic valve ON (Closed).

Firstly, in case where it is not necessary to maintain the brake fluid pressure of the wheel brake (4), the normally-open-type electromagnetic valve (6) is deenergized (in FIG. 5, electromagnetic valve OFF) and thus an electromagnetic attracting force for moving the movable core (41) is not in operation; and, therefore, as shown in FIGS. 1 and 2, due to the pressing and energizing force of the valve opening energizing spring (33), the movable core (41) is energized in the pasting direction from the fixed core (40) through the valve shaft (30), the valve body (32) is separated from the valve seat (28) to thereby open the valve hole (27), and the normally-open-type electromagnetic valve (6) holds its open state.

And, description will be given here of a case where a vehicle is caused to stop provisionally on an ascending slope and is then started. That is, in case where, to stop the vehicle, a driver removes his or her foot from an accelerator pedal (not shown) and puts his or her foot on a brake pedal (1) to execute a braking operation, as shown in FIG. 5, a brake SW (switch) is turned on and, as shown by the graph b, a braking force increases gradually; and, on the other hand, the clutch torque decreases gradually, thereby causing a strong creep state. And, in case where the driver continues to put the foot on the brake pedal (1) to thereby reduce the vehicle speed further, the clutch torque is reduced further due to such control, thereby providing a weak creep state as shown in FIG. 5. Also, the braking farce becomes the largest.

On the other hand, in the brake apparatus, the brake fluid in the master cylinder (2) is compressed due to the stepping-force on the brake pedal (1) and is thereby increased; and, the thus increased brake fluid pressure, while causing the brake fluid to flow, is transmitted through the brake fluid pipe (3) and the like to the brake fluid pressure maintaining apparatus (5) according to the present invention. And, the brake fluid pressure flows through the master-side fluid pressure passage (34) of the support body (10) into one fluid pressure chamber (24) and most of the brake fluid pressure of one liquid chamber (24) flows into the other fluid pressure chamber (25) through the cup-type seal (22) serving as the check valve (23). Here, as shown in FIGS. 1 and 2, since the normally-open-type electromagnetic valve (6) is open and the valve hole (27) is thereby opened, the brake fluid pressure also flows from one fluid pressure chamber (24) through one filter (37) and communication passage (36) into the valve chamber (31) or the housing (16) as well, and then flows through the valve hole (27) and the other filter (36) into the other fluid pressure chamber (25). And, the brake fluid pressure, which has flowed into the other fluid pressure chamber (25), is transmitted through the wheel-side fluid pressure passage (35) to the wheel brake (4) to thereby generate a braking force, so that the vehicle is caused to stop on the ascending slope. And, while the brake pedal (1) is being stepped, the brake fluid pressure is maintained at a high level in the master cylinder (2) and wheel brake (4) and thus, even on the ascending slope, the vehicle can be prevented from backing and can hold its stopping state.

Also, on sensing the stop of the vehicle, as shown by electromagnetic valve ON (closed) in FIG. 5, the normally-open-type electromagnetic valve (6) is energized and is thereby closed; and, therefore, the braking force can be maintained and the clutch torque decreases. Here, description will be given below of the closing operation of the normally-open-type electromagnetic valve (6) with reference to FIG. 3. Firstly, when a given value of current is allowed to flow in the electromagnetic coil (44), between the fixed core (40) and movable core (41), there is generated a given level of attracting force which exceeds the pressure energizing force of the valve opening energizing spring (33) and, due to the thus-generated attracting force, the movable core (43) is moved in the approaching direction to the fixed core (40) against the pressure energizing force of the valve opening energizing spring (33). Also, according to the present embodiment, since a magnetic path can be delivered and received between the recessed portion (53) and projecting portion (54) respectively formed in the attracting surfaces of the fixed core (40) and movable core (41), even when the movable core (41) and fixed core (40) are most distant from each other, a reduction in the attracting force is hard to occur, so that the smooth approaching movement of the movable core (41) is possible. Also, at the then time, the value of the current to be applied to the electromagnetic coil (44), as shown by (1) in FIG. 5, is maintained constant at a given value.

And, due to the approaching movement of the movable core (41), as shown in FIG. 3, the valve body (32) is moved through the valve shaft (30) in the valve seat (28) direction, the valve body (32) is seated on the valve seat (28), and the valve hole (27) is closed, thereby closing the normally-open-type electromagnetic valve (6). Not only because the normally-open-type electromagnetic valve (6) is closed in this manner but also because the check valve (23) prevents the return of the brake fluid pressure from the wheel brake (4) to the master cylinder (2), the brake fluid pressure of the wheel brake (4) can be maintained.

By the way, even when the normally-open-type electromagnetic valve (6) is closed in the above-mentioned manner, in case where the driver increases the stepping force on the brake pedal (1), the brake fluid pressure of the master cylinder (2) is transmitted through the check vale (23) to the wheel brake (4), thereby being able to increase the brake fluid pressure of the wheel brake (4).

Next, in case where the driver removes the foot from the brake pedal (1) or loosens the stepping force on the brake pedal (1) in order to start the vehicle on an ascending slope, the brake fluid pressure of the master cylinder (2) is lowered but, not only due to the brake fluid pressure maintaining function caused by the closed state of the normally-open-type electromagnetic valve (6) but also due to the return preventive operation of the check valve (23), the brake fluid pressure of the wheel brake (4) is prevented from returning to the master cylinder (2), which makes it possible to maintain the brake fluid pressure of the wheel brake (4). Therefore, even in a state where the stepping force on the brake pedal (1) is removed or loosened, the braking force can be maintained, which makes it possible to prevent the vehicle from backing on the ascending slope.

By the way, in case where the driver steps on the brake pedal (1) more strongly than necessary and thus the brake fluid pressure of the wheel brake (4) is higher than a given value, that is, a brake fluid pressure to be set by the above-mentioned attracting force, the relief mechanism (7) is operated to thereby be able to lower the braking force of the wheel brake (4) down to a relief pressure shown in the graph b of FIG. 5. Thanks to this relief mechanism (7), even when the driver steps on the brake pedal (1) more strongly than necessary, the dragging of the braking force can be reduced, which makes it possible to start the vehicle smoothly.

Referring to the control of the relief mechanism (7), because the brake fluid pressure of the wheel brake (4) higher than the attracting force is applied to the seal surface of the valve body (32), the movable core (41), together with the valve body (32) and valve shaft (30) is moved in the parting direction against the attracting force, and the valve body (32) is separated from the valve seat (28), so that the valve hole (27) is opened. Therefore, the brake fluid pressure of the wheel brake (4) is returned through the valve hole (27) to the master cylinder (2) so that the brake fluid pressure of the wheel brake (4) can be lowered. In case where the brake fluid pressure of the wheel brake (4) is lowered down to a given value, the attracting force of the normally-open-type electromagnetic valve (6) is allowed to act again, so that the movable core (41) is moved in the approaching direction and thus the valve body (32) is seated on the valve seat (28) through the valve shaft (30), thereby closing the valve hole (27); and, therefore, the brake fluid pressure of the wheel brake (4) can be maintained at the given value.

And, when the stepping force on the brake pedal (1) is released completely, as shown in FIG. 5, the brake SW is switched over to OFF, as that, due to the stepping on the accelerator pedal and creep phenomenon, the clutch torque increases to thereby provide a strong creep state. Also, there is a small time lag before the strong creep state is obtained after the driver releases the stepping force on the brake pedal (1) and steps on the accelerator pedal. However, during the time of such time lag, since the normally-open-type electromagnetic valve (6) remains closed, the braking force of the wheel brake (4) can be maintained, thereby being able to prevent the vehicle from moving back.

Also, even in case where the normally-open-type electromagnetic valve (6) is closed, due to the return function of the relief mechanism (7), the brake fluid pressure of the wheel brake (4) can be returned to the master cylinder (2) side by a slight amount. Due to the brake fluid pressure slight amount return function, the braking force is gradually lowered down to such a low value (in FIG. 5, the orifice rate of the graph b) that does not hinder the starting operation of the vehicle due to the stepping on the accelerator pedal; however, since this lowering is slow, the large backward movement of the vehicle can be prevented.

Referring now to the above-mentioned return function, in the normally-open-type electromagnetic valve (6), as shown by the block (2) of the graph c in FIG. 5, by gradually reducing the value of the current to be applied to the electromagnetic coil (44), the attracting force of the normally-open-type electromagnetic valve (6) is gradually reduced. In the present embodiment, the current value is reduced linearly according to a previously set linear function. And, as the attracting force is reduced, the brake fluid pressure of the wheel brake (4) higher than the attracting force is applied to the valve body (32), so that the valve body (32) is separated from the valve seat (28) according to this pressure difference, the valve hole (27) is opened, and the brake fluid pressure of the wheel brake (4) is gradually returned to the master cylinder (2). Therefore, the braking force of the wheel brake (4), as shown in the graph b of FIG. 5, can be reduced linearly in proportion to the current value of the graph c, that is, the attracting force down to such a minimum that does not hinder the vehicle starting operation due to the stepped-down accelerator pedal.

On the other hand, in case where the driver steps on the accelerator pedal, the drive force for starting the vehicle (clutch torque) increases gradually, so that the vehicle can start on the ascending slope. In this starting operation, as described above, since the minimum brake force, which is necessary for help or the vehicle start while preventing the vehicle against excessive backward movement, is maintained in the wheel brake (4) by the brake fluid pressure maintaining apparatus (5) according to the present invention, it is not necessary to use a wasteful drive force which is caused by the dragging of the braking force and, at the same time, the vehicle can be started smoothly and quickly while preventing the vehicle from moving back greatly.

Also, after the vehicle starts, as shown in FIG. 5, in case where the electromagnetic coil (44) is deenergized to remove the attracting force, the energizing force of the valve opening energizing spring (33) is allowed to act and thus, as shown in FIGS. 1 and 2, the movable core (41) is moved in the approaching direction to the fixed core (40). Due to the approaching movement of the movable core (41) to the fixed core (40), the valve body (32) is removed from the valve seat (28) and thus the valve hole (27) is opened, so that the normally-open-type electromagnetic valve (6) is opened. Because of the opened state of the normally-open-type electromagnetic valve (6), the minimum brake fluid pressure remaining in the wheel brake (4) is returned through the valve hole (27) to the master cylinder (2), thereby reducing the unnecessary dragging of the brake, which makes it possible to run the vehicle smoothly.

Next, description will be given below of the stop and start of the vehicle on a descending slope. The driver, similarly to the ascending slope, steps on the brake pedal (1) to increase the brake fluid pressure of the master cylinder (2) to thereby cause the wheel brake (4) so as to generate a braking force and thus stop the vehicle; and, at the same time, the driver continues to step on the brake pedal (1) to thereby be able to keep the stopping state of the vehicle on the descending slope. Depending on various conditions such as the stop of the vehicle, in the brake fluid pressure maintaining apparatus [5], similarly to the ascending slope, since the normally-open-type electromagnetic valve (6) is energized (ON) and a current is applied to the electromagnetic coil (44), between the fixed core (40) and movable core (41), there is generated a given attracting force which exceeds the pressure energizing force of the valve opening energizing spring (33). Due to this attracting force, the movable core (41) is moved in the approaching direction to the fixed core (40) against the pressure energizing force of the valve opening energizing spring (33), and the valve body (32) is seated on the valve seat (28) through the valve shaft (30) to thereby close the valve hole (27), so that, as shown in FIG. 3, the normally-open-type electromagnetic valve (6) can be closed. Thanks to the closed state of the normally-open-type electromagnetic valve (6), the brake fluid pressure of the wheel brake (4) can be maintained.

Next, to start the vehicle on the descending slope, the driver releases the foot from the brake pedal (1) or loosens the stepping force on the brake pedal (1). And, without stepping on the accelerator pedal, the driver steps on the clutch pedal to cut off the start clutch, that is, while keeping on the cut-off state of the start clutch, the driver tries to move the vehicle downward using the dead weight of the vehicle. In the case of this operation as wall, as described above, since the closed state of the normally-open-type electromagnetic valve (6) can maintain the brake fluid pressure of the wheel brake (4) and thus the braking force is working, the vehicle can be prevented from moving downward suddenly.

Also, in case where the driver steps on the brake pedal (1) excessively strongly and thus the brake fluid pressure of the wheel brake (4) becomes higher than a brake fluid pressure of a given value corresponding to the attracting force, the relief mechanism (7) is operated to open the valve hole (27), thereby return the brake fluid pressure of the wheel brake (4) to the master cylinder (2) side; and, therefore, the brake fluid pressure of the wheel brake (4) can be reduced down to the given value.

Next, due to the operation of the return mechanism, in case where the value of the current to be applied to the electromagnetic coil (44) is gradually reduced to thereby reduce the attracting force gradually, the brake fluid pressure of the wheel brake (4) is gradually returned to the master cylinder (2) and thus the braking force of the wheel brake (4) is gradually decreased; however, there is still secured the minimum braking force that can prevent the sudden start of the vehicle on the descending slope. And, due to the lowered braking force, even in case where the driver does not step on the accelerator pedal, the vehicle is able to move downward gradually on the descending slope due to its own dead weight, which makes it possible for the driver to start the vehicle smoothly.

As described above, in the brake fluid pressure maintaining apparatus (5) according to the present embodiment, the normally-open-type electromagnetic valve (6) has not only the brake fluid pressure maintaining function but also the brake fluid pressure relief function; and further, the relief function serves also as a brake fluid pressure return function corresponding to the conventional orifice. Thanks to this, the number of parts of the brake fluid pressure maintaining apparatus (5) as well as the number or working and assembling steps thereof can be reduced, which makes it possible to facilitate the manufacture of the brake fluid pressure maintaining apparatus. Also, together with the reduced number of parts, the recessed portion and projecting portion are formed in the attracting surfaces of the fixed core (40) and movable core (41) to thereby reduce the possibility that the attracting force can be lowered; and, therefore, the electromagnetic parts such as the electromagnetic coil (44) can be prevented from becoming huge in size and thus the brake fluid pressure maintaining apparatus (5) can be made compact.

Also, simply by previously setting the value of the current to be applied to the electromagnetic coil (44), the brake fluid pressure to be maintained by the wheel brake (4) can be set arbitrarily, that is, can be increased or decreased. Therefore, the present brake fluid pressure maintaining apparatus (5) can be applied not only to a small-size vehicle but also to a large-size vehicle requiring a large braking force; that is, there can be obtained the brake fluid pressure maintaining apparatus (5) which is highly versatile and can be applied to every type of vehicle. Also, the relief function and return function can be operated easily by changing the current value of the normally-open-type electromagnetic valve (6). Further, differently from the conventional orifice composed of a recessed groove, there is eliminated the need to test the flow quantity of the brake fluid pressure for every product after it is manufactured; and, therefore, by adjusting the current value, not only the reducing rate of the brake fluid pressure of the wheel brake (4) due to the return function (that is, orifice rate) can be set easily, but also the reduction of the brake fluid pressure due to the return function can be made smoothly, which makes it possible to start the vehicle smoothly.

Also, in the above-mentioned first embodiment, when the return function of the relief mechanism (7) is in operation, as shown by the block (2) of the graph c in FIG. 5, the current value, that is, the attracting force is reduced linearly according to a linear function. However, the attracting force, as shown by graphs d, e, can also be reduced in a curved line manner according a quadratic function, or functions can be selected properly to thereby operate the return function according to the running conditions of the vehicle. For example, when starting the vehicle on an ascending slope, in case where the attracting force is reduced in such a curved line manner as shown by the graph d, just after release of the foot from the brake pedal (1), the reduction of the brake fluid pressure is slow, which can prevent the vehicle against great backward movement; and, when an engine starts and a drive force increases, the reduction of the brake fluid pressure is promoted. Therefore, while reducing the dragging of the braking force, the start of the vehicle on the ascending slope can be carried out smoothly.

In the case of the start of the vehicle on a descending slope, when the return function of the relief mechanism (7) is in operation, in case where the attracting force is reduced in such a curved line as shown by the graph e, just after release of the foot from the brake pedal (1), the return quantity of the brake fluid pressure is large before the drive force is increased and, therefore, even without stepping on the accelerator pedal, the vehicle is allowed to move down gradually on the descending slope due to its own dead weight. Also, when the drive force becomes large, by reducing the brake fluid pressure slowly, the sudden downward movement of the vehicle on the descending slope can be prevented.

Also, in the above embodiment, the cup-type seal (22) is used as the check valve (23); however, instead of the cup-type seal (22), there can also be used another member such as an O ring and there can also be employed a conventionally known structure properly. Further, in the above embodiment, the projecting portion (54) of the movable core (41) is formed in a cylindrical shape and the recessed portion (53) of the fixed core (40) is also structured such that the inner peripheral surface of the ring-shaped wall surface (52) is formed in a cylindrical shape, while the attracting surfaces of the projecting portion (54) and recessed portion (53) are disposed in parallel to each other in the axial direction. However, another embodiment is also possible. For example, the projecting portion (54) of the movable core (41) may be formed in a truncated cone shape the upper portion of which has a large diameter and the lower portion of which has a small diameter; the recessed portion (53) of the fixed core (40) correspondingly to the shape of the truncated-cone-shaped projecting portion (54), may be formed in a funnel shape having a large-diameter upper portion and a small-diameter lower portion; and, the attracting surfaces of the projecting portion (54) and recessed portion (53) maybe arranged in a tapered manner. Also, provided that the normally-open-type electromagnetic valve (6) is used, the shape of the brake fluid pressure maintaining apparatus is not limited to that of the present embodiment but it can be formed in an arbitrary shape.

Since the brake fluid pressure maintaining apparatus according to the present invention is structured in the above-mentioned manner, that is, since, by changing the value of a current to be applied to a the normally-open-type electromagnetic valve, the brake fluid pressure to be maintained by a wheel brake can be set arbitrarily, the present brake fluid pressure maintaining apparatus can be applied to all types of vehicles differing in weight, that is, it can be used versatilely regardless of types of vehicles. Also, by adjusting the current value, the normally-open-type electromagnetic valve is allowed to have a relief function and a brake fluid pressure return function similar to the conventional orifice, thereby being able to reduce not only the number of parts of the brake fluid pressure maintaining apparatus but also the number of working and assembling steps thereof. Thanks to this, the brake fluid pressure maintaining apparatus can be manufactured easily and can be made compact. With use of the brake fluid pressure maintaining apparatus according to the present invention, when starting the vehicle after execution of the braking operation, by maintaining the brake fluid pressure, the large backward movement of the vehicle on an ascending slope and the sudden start of the vehicle on a descending slope, which provide obstacles to the proper start of the vehicle, can be restricted highly effectively; and, therefore, while reducing the unnecessary dragging of the braking force, the smooth start of the vehicle is possible.

What is claimed is:

1. A brake fluid pressure maintaining apparatus for a vehicle, comprising:
a master cylinder for generating a brake fluid pressure when a driver steps on a brake pedal;
a check valve interposed between the master cylinder and a wheel brake operatable by the brake fluid pressure from the master cylinder for allowing the flow of the brake fluid pressure from the master cylinder to the wheel brake in a braking operation; and, a normally-open electromagnetic valve closable in order to temporarily maintain the brake fluid pressure of the wheel brake even after release of stepping on the brake pedal, wherein the normally-open electromagnetic valve includes an electromagnetic coil for generating an electromagnetic force when a current is applied thereto, a fixed core to be immovably disposed, and a movable core to be attracted to the fixed core, and in a brake fluid pressure maintaining state, the normally-open electromagnetic valve is closed due to the electromagnetic force to thereby prevent the return of the brake fluid pressure from the wheel brake to the master cylinder and, in a brake fluid pressure no-maintaining state, the normally-open electromagnetic valve is always opened to thereby allow the flow of the brake fluid pressure from the master cylinder to the wheel brake or the return of the brake fluid pressure from the wheel brake to the master cylinder, and wherein the normally-open electromagnetic valve is controllable as follows:

when it is detected that the vehicle is stopped, the electromagnetic coil is energized and the normally-open electromagnetic valve is closed;

by changing the value of the current to be applied to the electromagnetic coil, an attracting force for closing the normally-open electromagnetic valve is changed; and by setting the attracting force at a given value, the brake fluid pressure to be maintained on the wheel brake side is set;

wherein, when the normally-open electromagnetic valve is closed due to application of a current to the electromagnetic coil, in case where the brake fluid pressure of the wheel brake is higher than the attracting force of the given value, the normally-open electromagnetic valve is opened against the attracting force to thereby reduce the brake fluid pressure of the wheel brake down to the given value.

2. A brake fluid pressure maintaining apparatus for a vehicle as set forth in claim 1, wherein the normally-open electromagnetic valve is structured such that a recessed portion having a ring-shaped wall surface is formed in one of the mutually attracting surfaces of the fixed core and movable core, a projecting portion to be inserted into the recessed portion is formed in the other, the projecting portion is disposed so as to face the ring-shaped wall surface and, when the movable core is attracted by the fixed core, the projection portion is inserted into the recessed portion and the ring-shaped wall surface is situated on the outer periphery of the projection portion.

3. A brake fluid pressure maintaining apparatus for a vehicle as set forth in claim 2, wherein the check valve is a cup seal which is disposed on the outer periphery of the normally-open electromagnetic valve not only to separate the master cylinder side and wheel brake side from each other but also to allow only the flow of the brake fluid pressure from the master cylinder to the wheel brake but prevent the return of the brake fluid pressure from the wheel brake to the master cylinder.

4. A brake fluid pressure maintaining apparatus for a vehicle as set forth in claim 3, further comprising:

a housing formed as a stepped cylindrical shape including a small-diameter portion and a large-diameter portion, at least a portion of the housing comprising the fixed core;

a cylindrical-shaped valve seat member mounted on and fixed to an interior of a lower end side of the large-diameter portion;

a tapered valve seat disposed on the upper end side of the cylindrical-shaped valve seat member;

a valve hole formed in the axial direction thereof within the tapered valve seat; and a valve shaft slidable in an axial direction and in contact with the movable core;

a valve chamber formed between the valve shaft and the valve seat member so as to face the valve seat;

an inverted-conical-shaped valve body seated on the tapered valve seat; and a valve-opening energizing spring energizing the valve shaft in an opposite direction to the valve seat member, wherein, normally, the valve body is separated from the valve seat and the valve hole is opened due to the pressure energizing force of the valve-opening energizing spring.

5. A brake fluid pressure maintaining apparatus for a vehicle as set forth in claim 4, wherein:

when the brake fluid pressure is maintained, in case where a current is applied, there is generated an attracting force which moves the movable core in an approaching direction to the fixed core; and the attracting force is set so as to exceed the energizing force of the valve opening energizing spring which is used to press and energize the valve body in the valve opening direction.

6. A brake fluid pressure maintaining apparatus for a vehicle as set forth in claim 5, wherein:

where the movable core is moved in the approaching direction to the fixed core due to the attracting force against the energizing force of the valve opening energizing spring, the valve body is seated on the valve seat through the valve shaft to thereby close the valve hole, so that the normally-open electromagnetic valve is closed.

7. A brake fluid pressure maintaining apparatus for a vehicle as set forth in claim 4, further comprising:

a master-side fluid pressure passage communicating with the master cylinder, one fluid pressure chamber;

a wheel-side fluid pressure passage communicating with the wheel brake; and a plurality of tube-shaped communication passages in the large-diameter portion allowing the one fluid pressure chamber and the valve chamber to communicate with each other, wherein the master-side fluid pressure passage and valve chamber communicate with each other.

8. A brake fluid pressure maintaining apparatus for a vehicle as set forth in claim 4, wherein:

when the brake fluid pressure is not maintained, the normally-open electromagnetic valve is deenergized and no attracting force is generated between the fixed core and the movable core; and due to the pressure energizing force of the valve opening energizing spring mounted in contact with the valve shaft and within the valve chamber the movable core is pressed and energized in a parting direction from the fixed core through the valve shaft and, at a same time, the valve body is separated from the valve seat to thereby open the valve hole, so that the normally-open electromagnetic valve is held open.

9. A brake fluid pressure maintaining apparatus for a vehicle as set forth in claim 1, further comprising recessed one or more flow grooves in an axial direction in each of an outer peripheral surface of the movable core and a valve shaft contactable with the movable core, wherein
the one or more grooves allow the brake fluid to flow freely between a housing and guide tube housing the movable core,
the one or more grooves prevent a generation of the pressure difference between an interior of the housing and a guide tube housing the movable core, thereby permitting the smooth movement of the movable core and a valve shaft moving with the movable core.

10. A brake fluid pressure maintaining apparatus for a vehicle as set forth in claim 9, further comprising a recessed portion forming a ring shaped surface in the fixed core and a cylindrical ring shaped projecting surface in the movable core which is disposed to face the recessed portion of the fixed core, wherein in a state where the fixed core and movable core are most distant from each other with no attracting force applied therebetween, a leading end of the cylindrical ring shaped projecting surface is slightly inserted into the recessed portion.

11. A brake fluid pressure maintaining apparatus for a vehicle as set forth in claim 1, wherein the normally-open electromagnetic valve is closed and reduces the brake fluid pressure of the wheel brake down to the given value and, after then, due to decreasing the value of the current to be applied to the electromagnetic coil gradually, reduces the attracting force gradually, thereby reduces the brake fluid pressure of the wheel brake gradually due to the variations in the attracting force.

12. A brake fluid pressure maintaining apparatus for a vehicle as set forth in claim 11, wherein the normally-open electromagnetic valve decreases the attracting force due to gradually reducing the value of the current to be applied to the electromagnetic coil according to a previously set function.

13. A brake fluid pressure maintaining apparatus for a vehicle as set forth in claim 1, further comprising:
a housing formed as a stepped cylindrical shape including a small-diameter portion and a large-diameter portion; and
a guide tube which is connected and fixed to an upper end of the fixed core to guide the movable core with respect to the fixed core, wherein
the fixed core is disposed on an upper end of the small-diameter portion,
the movable core is contacted with an upper end of a valve shaft to press and move the valve shaft in a valve closing direction,
the movable core is formed in a cylindrical shape and is disposed so as to be contactable with the upper end of the valve shaft, and
when the normally-open electromagnetic valve is not in operation, due to a pressure energizing force of a valve-opening energizing spring mounted in a valve chamber, the movable core is energized through the valve shaft in the direction where it is moved apart from the fixed core.

14. A brake fluid pressure maintaining apparatus for a vehicle as set forth in claim 1, wherein the normally-open electromagnetic valve includes a valve shaft in direct contact with the movable core when the movable core is attracted by the fixed core.

15. A brake fluid pressure maintaining apparatus for a vehicle as set forth in claim 1, wherein the normally-open electromagnetic valve comprises a single spring which is disposed between a tapered valve seat and an upper end side of a cylindrical-shaped valve seat member.

16. A brake fluid pressure maintaining apparatus for a vehicle as set forth in claim 1, wherein the normally-open electromagnetic valve includes a solenoid part which is devoid of a spring therein.

17. A brake fluid pressure maintaining apparatus for a vehicle, comprising:
a master cylinder;
a check valve interposed between the master cylinder and a wheel brake; and
means for reducing a fluid pressure of the wheel brake by adjusting an attracting force between a movable core and a fixed core of a normally-open electromagnetic valve when the brake fluid pressure of the wheel brake is higher than an attracting force of a given value,
wherein the normally-open electromagnetic valve is capable of the following function: when it is detected that the vehicle is stopped, an electromagnetic coil of the normally-open electromagnetic valve is energized and the normally-open electromagnetic valve is closed.

18. A brake fluid pressure maintaining apparatus for a vehicle as set forth in claim 17, further comprising a means for increasing the attracting force between the fixed core and the movable core.

19. A brake fluid pressure maintaining apparatus for a vehicle as set forth in claim 18, wherein the increasing means includes a projection fitting within a recess of the movable and the fixed core.

20. A brake fluid pressure maintaining apparatus for a vehicle as set forth in claim 17, wherein the means for reducing a pressure is provided gradually such that the attracting force is gradually reduced.

21. A brake fluid pressure maintaining apparatus for a vehicle as set forth in claim 17, wherein the means for reducing a pressure includes a current applied to the normally-open electromagnetic valve to close the normally-open electromagnetic valve and reduce the brake fluid pressure of the wheel brake down to the given value and, after then, due to decreasing the value of the current to be applied to the electromagnetic coil gradually, reduce the attracting force gradually and thus reduce the brake fluid pressure of the wheel brake gradually due to variations in the attracting force.

22. A brake fluid pressure maintaining apparatus for a vehicle as set forth in claim 17, further comprising a means for preventing a pressure difference from being generated between an interior of the housing and guide tube due to movement of the movable core.

23. A brake fluid pressure maintaining apparatus for a vehicle, comprising:
a check valve interposed between a master cylinder and a wheel brake; and
means for adjusting a brake fluid pressure in the wheel brake on an ascending or descending slope by adjusting a current to a normally-open electromagnetic valve having an electromagnetic coil disposed between a movable core and a fixed core to increase or decrease an attracting force between the movable core and the fixed core,
wherein after the brake fluid pressure of the wheel brake is lowered to a given value under the control of the adjusting means, a value of the current applied to the electromagnetic coil is lowered to reduce the attracting force acting on the movable core, the brake fluid pressure of the wheel brake becomes higher than the attracting force that can close the normally-open electromagnetic valve, and the high brake fluid pressure of the wheel brake acts on a seal surface so that a valve body is separated from a valve seat of the seal surface against the attracting force to thereby open a valve hole so that the normally open electromagnetic valve is opened and in the opened state, the fluid pressure of the wheel brake is returned through the valve hole to the master cylinder to lower the fluid pressure of the wheel brake.

* * * * *